(12) United States Patent
Crnkovich et al.

(10) Patent No.: US 7,806,140 B2
(45) Date of Patent: Oct. 5, 2010

(54) POWER SAVING LOCKING COIL

(75) Inventors: Andrew Crnkovich, Elmhurst, IL (US); Konstantin A. Shukhmin, Tauranga (NZ); Rana J. Waitai, Tauranga (NZ); Andrew J. Palmer, Tauranga (NZ)

(73) Assignee: Robertshaw Controls Company, Carol Stream, IL (US)

( * ) Notice: Subject to any disclaimer, the term of this patent is extended or adjusted under 35 U.S.C. 154(b) by 781 days.

(21) Appl. No.: 11/736,199

(22) Filed: Apr. 17, 2007

(65) Prior Publication Data

US 2007/0240775 A1 Oct. 18, 2007

Related U.S. Application Data

(60) Provisional application No. 60/792,731, filed on Apr. 18, 2006, provisional application No. 60/792,776, filed on Apr. 18, 2006, provisional application No. 60/802,659, filed on May 23, 2006.

(51) Int. Cl.
*F16K 11/065* (2006.01)

(52) U.S. Cl. .......................... 137/625.33; 137/614.11; 251/129.1; 251/337

(58) Field of Classification Search ................. 137/269, 137/614.11, 614.19, 625.33; 251/67, 69, 251/129.1, 337
See application file for complete search history.

(56) References Cited

U.S. PATENT DOCUMENTS

| | | |
|---|---|---|
| 2,910,089 A | 10/1959 | Yarber |
| 3,422,329 A | 1/1969 | Anderson et al. |
| 4,909,277 A | 3/1990 | Vandiver |
| 5,509,439 A | 4/1996 | Tantardini |
| 5,727,591 A | 3/1998 | Doll |
| 2006/0278285 A1 | 12/2006 | Shukhmin et al. |

FOREIGN PATENT DOCUMENTS

| | | |
|---|---|---|
| EP | 0 412 212 A1 | 2/1991 |
| EP | 1 158 230 A2 | 11/2001 |

(Continued)

OTHER PUBLICATIONS

International Search Report; International Application No. PCT/NZ2005/000135; Date of actual completion of the international search Aug. 12, 2005; Date of mailing of the international search report Aug. 19, 2005;4 pages.

*Primary Examiner*—John Fox
(74) *Attorney, Agent, or Firm*—Reinhart Boerner Van Deuren P.C.

(57) ABSTRACT

A variable flow valve is provided. The variable flow valve includes a housing, an actuator, a biasing agent, positioning coils, and a locking coil. The housing defines a bore, an inlet, and an outlet. The actuator is moveably disposed within the bore and configured to selectively obstruct and expose the outlet. The biasing agent is disposed within the bore. The biasing agent is also interposed between the housing and the actuator to bias the actuator toward the outlet. The positioning coils are disposed about the housing and operable to drive the biasing agent to a retracted position. The locking coil is disposed about the housing proximate the biasing agent. The locking coil is operable to capture the biasing agent in the retracted position. As such, the positioning coils are thereafter able to move the actuator free of the bias from the biasing agent.

18 Claims, 9 Drawing Sheets

FOREIGN PATENT DOCUMENTS

| | | |
|---|---|---|
| EP | 0 766 030 B1 | 12/2001 |
| EP | 1 277 996 A2 | 1/2003 |
| GB | 2 277 573 A | 11/1994 |
| GB | 2 325 725 A | 12/1998 |
| WO | WO 94/19612 | 9/1994 |
| WO | WO 96/08656 | 3/1996 |

FULL ON POSITION

POWER SAVING LOCKING COIL

CROSS-REFERENCE TO RELATED PATENT APPLICATIONS

This patent application claims the benefit of U.S. Provisional Patent Application No. 60/792,731, filed Apr. 18, 2006, U.S. Provisional Patent Application No. 60/792,776, filed Apr. 18, 2006, and U.S. Provisional Patent Application No. 60/802,659, filed May 23, 2006, the teachings and disclosures of which are hereby incorporated in their entireties by reference thereto.

FIELD OF THE INVENTION

This invention generally relates to fluid control valves and, more particularly, to power and cost saving fluid control valves.

BACKGROUND OF THE INVENTION

In the variable flow valve (VFV) of U.S. Pub. Pat. Appln. 2006/0278285 entitled "Variable Flow Valve," the teachings and disclosure of which are hereby incorporated in their entireties by reference thereto, a return spring forcibly biases a plunger toward an outlet to ensure that the valve remains in a closed position when the valve is not powered. To draw the plunger away from the outlet and place the valve in the open position, the force of the return spring must be overcome. This is generally accomplished by providing a certain amount of power to the valve. Thus, the total power consumption of the valve is affected by the need to counteract the force of the spring found in the valve.

In modern or high end appliances or other systems, several of the above-noted valves may be included to, for example, control the flow of gas to the concentrically, spaced-apart burners. Typically, the inner burner is used for low heat cooking and the outer burner or burners are used for higher temperature cooking. Here, multiple valves are employed to meter the gas to its respective burner to accommodate the heating level called for by the user. Therefore, to redirect or simultaneously feed fluid (e.g., gas) flow from one source to different outlets requires the use or two or more valves.

Unfortunately, for those appliances that utilize and control numerous valves, the overall cost of ownership and the overall cost of operation of the appliance may be significantly increased. Indeed, each valve that must be purchased and installed by the appliance manufacture adds cost to the overall purchase price of the appliance. In addition, each return spring force that must be overpowered to place each valve in the open position adds to the overall amount of power drawn by the appliance.

There exists, therefore, a need in the art for a cost-saving, power-saving valve that improves upon the above-noted valve. The invention provides such a valve. These and other advantages of the invention, as well as additional inventive features, will be apparent from the description of the invention provided herein.

BRIEF SUMMARY OF THE INVENTION

The variable flow valve disclosed herein uses less power than conventional flow control valves. Therefore, the valve provides substantial cost savings during day to day operation and over the life of the system where the valve is used. Because embodiments of the valve are also able to operably couple to a flow directing mechanism, the valve is able to meter out a particular amount of fluid and then divide that fluid between multiple outputs.

In one embodiment, the variable flow valve includes a housing, an actuator, a biasing agent, positioning coils, and a locking coil. The housing defines a bore, an inlet, and an outlet. The actuator is moveably disposed within the bore and configured to selectively obstruct and expose the outlet. The biasing agent is disposed within the bore. The biasing agent is also interposed between the housing and the actuator to bias the actuator toward the outlet. The positioning coils are disposed about the housing and operable to drive the biasing agent to a retracted position. The locking coil is disposed about the housing proximate the biasing agent. The locking coil is operable to capture the biasing agent in the retracted position. As such, the positioning coils are thereafter able to move the actuator free of the bias from the biasing agent.

In another embodiment, the variable flow valve includes a housing, magnetic and non-magnetic elements, a spring lock plunger, a coil spring, positioning coils, and a locking coil. The housing defines a bore, an inlet, and an outlet. The shaft is disposed within the bore and has first and second ends. The first end includes a plunger to restrict a flow of fluid through the outlet. The plurality of magnetic and non-magnetic elements are alternatingly disposed on the shaft beginning proximate the first end. The spring lock plunger is disposed within the bore and adjacent the first end of the shaft. The coil spring is disposed within the bore and interposed between the spring lock plunger and the housing. The positioning coils are disposed about the housing and selectively operable to drive the actuator back and forth within the bore. The locking coil is disposed about the housing and operable to hold the spring lock plunger and coil spring away from the shaft such that the coil spring exerts no biasing force upon the shaft.

In a further embodiment, a flow control system is provided. The flow control system includes a variable flow control valve, a multi-outlet fluid control valve, and a controller. The variable flow control valve includes a plurality of positioning coils and a locking coil. The locking coil retains a biasing agent in a retracted position when energized. The multi-outlet fluid control valve is operably coupled to the variable flow control valve and includes a plurality of solenoids. The controller is operably coupled to the variable flow control valve and the multi-outlet fluid control valve. The controller is able to simultaneously control the positioning coils, locking coil, and solenoids to meter a fluid to an appliance.

In yet another embodiment, a method of saving power when metering fluid with a variable flow valve is provided. The method includes the steps of driving a return spring into a compressed position and retaining the return spring in the compressed position while the fluid is metered.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
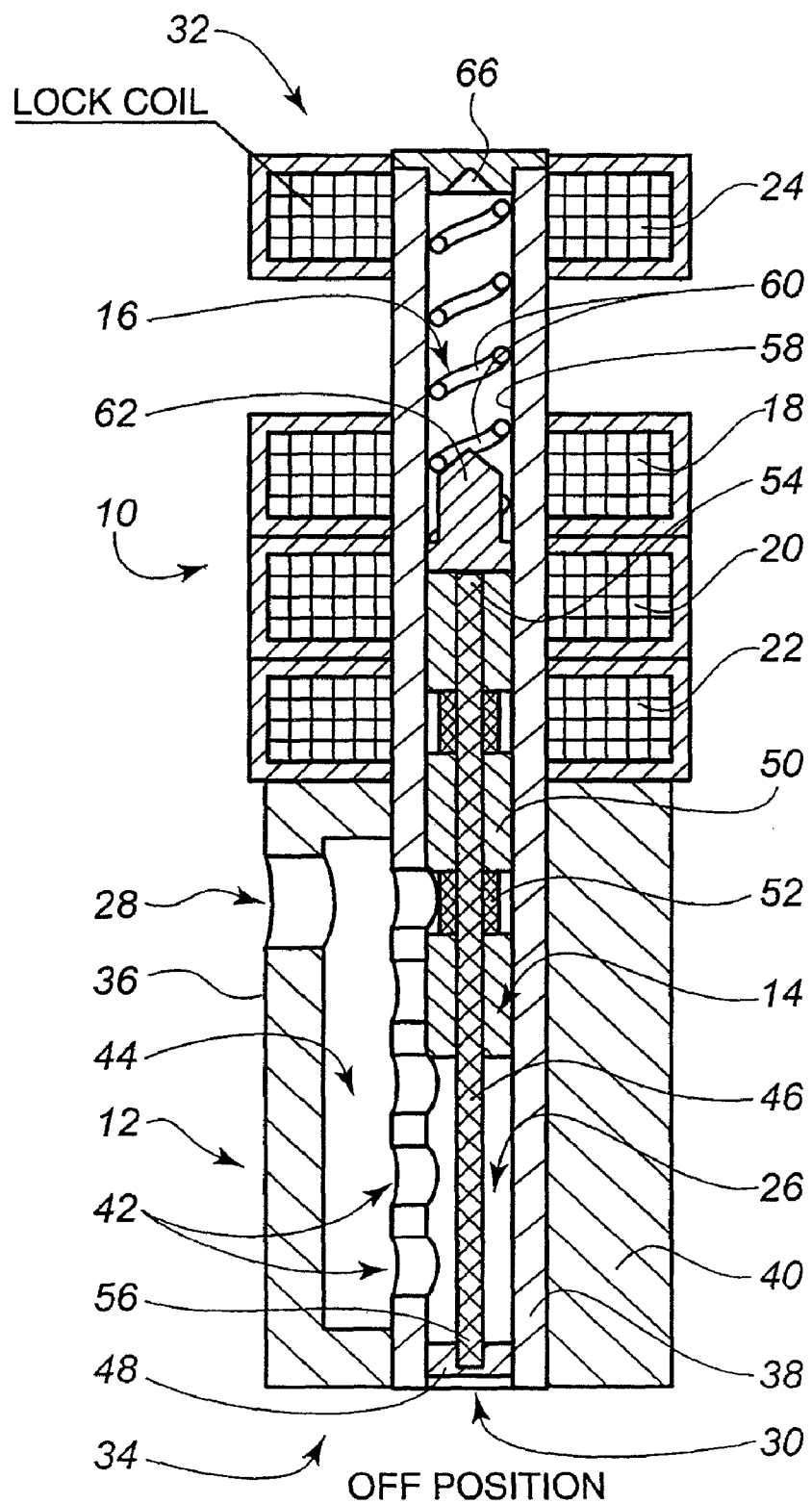
FIG. 1 is a cross sectional view of an exemplary embodiment of a variable flow valve in an off position in accordance with the teachings of the present invention.

Referring to FIG. 1, a variable flow valve 10 is illustrated. As will be more fully explained below, the variable flow valve 10 uses less power than conventional flow control valves. Therefore, the variable flow valve 10 provides substantial cost savings during day to day operation and over the life of the system where the valve is used. The variable flow valve 10 includes a housing 12, an actuator 14, a biasing agent 16, positioning coils 18, 20, 22, and a locking coil 24.

As shown in FIG. 1, the housing 12 defines a bore 26, an inlet 28, and an outlet 30. The bore 26 extends generally axially through the housing 12 from, as oriented in FIG. 1, a top 32 of the housing to a bottom 34. In the illustrated embodiment, the inlet 28 passes through a side wall 36 of the housing 12 while the outlet 30 passes through the bottom 34 of the housing. Despite this configuration, the inlet 28 and outlet 30 may be otherwise arranged. Also, the inlet 28 and outlet 30 are suitably fitted or equipped with a variety of different attachments or connectors for connecting the inlet to a source and the outlet to another component of, for example, an appliance.

In the illustrated embodiment, the housing 12 is formed from a central cylinder 38 and a sleeve 40 wrapped around a lower portion of the central cylinder. However, in other embodiments the housing 12 may be unitarily formed. The sleeve 40 fits flush with the outside surface of the central cylinder 38, except where metering apertures 42 pass through the central cylinder. Where the metering apertures 42 are disposed, the sleeve 40 is spaced apart from the central cylinder 38 to form a chamber 44. As will be more fully explained below, the greater the number of metering apertures 42 that are selectively opened and exposed, the greater the amount of fluid or the greater the discretely different amounts that that flows through the valve 10. Depending on the particular application, the fluid may be a liquid or a gas such as, for example, natural gas.

The actuator 14 is moveably disposed within the bore 26 of the housing 12. By driving the actuator 14 either toward or away from the outlet 30, the actuator 14 is able to selectively obstruct or expose the outlet 30. In the illustrated embodiment, the actuator 14 includes a shaft 46 (a.k.a., valve member or piston), a plunger 48, and magnetic and non-magnetic elements 50, 52. As oriented in FIG. 1, the shaft 46 has a top end 54 and a bottom end 56. The plunger 48 is operably coupled to the bottom end 56 of the shaft 46 such that the plunger 48 is able to, at times, obstruct the outlet 30 in the housing 12 to restrict a flow of fluid through the outlet.

The magnetic and non-magnetic elements 50, 52 are alternatingly disposed on the shaft 46 beginning with a magnetic element proximate the top end 54 of the shaft. In the illustrated embodiment, the magnetic elements 50 engage an inner wall 58 of the bore 26 while the non-magnetic elements 50 are spaced apart from the inner wall of the bore. The lowest magnetic element 50 on the shaft 46 is axially spaced apart from the plunger 48. Despite the illustrated embodiment, the magnetic and non-magnetic elements 50, 52 may be otherwise arranged so as to move the shaft 46 and plunger 48. Each of the magnetic and non-magnetic elements 50, 52 are suitably constructed from a variety of different materials.

The biasing agent 16 is disposed within the bore 26 of the housing 12. As shown, the biasing agent 16 is interposed between the housing 12 and the actuator 14 to bias the actuator toward the outlet 30. In the illustrated embodiment, the biasing agent 16 includes a coil spring 60 (a.k.a., a return spring) and a spring lock plunger 62. As shown, the spring 60 is interposed between the top 32 of the housing 12 and the spring lock plunger 62 within the bore 26. In the illustrated embodiment, both the spring 60 and the spring lock plunger 62 are constructed from a magnetic material such as, for example, metal.

The spring lock plunger 62 is adjacent to the shaft 46 and the uppermost magnetic element 50. However, the spring lock plunger 62 is not secured to either of the shaft 46 or the magnetic element 50. The spring lock plunger 62 is simply biased against the shaft 46 and the magnetic element 50 by the biasing force supplied by the spring 60. In the illustrated embodiment, a portion of the spring lock plunger 62 is inserted inside the coils of the spring 60. The spring lock plunger 62 also has a pointed end 60 generally directed toward, and configured to be received within, a receptacle 66 (a.k.a., depression) in the top of the housing 12 within the bore 26.

Still referring to FIG. 1, the positioning coils 18-22 are disposed about the housing 12. In the illustrated embodiment, three of the positioning coils 18-22 are illustrated. Even so, more or fewer of the positioning coils 18-22 may be suitably employed. Although not shown, the positioning coils 18-22 are electrically connected to a power source. When they are energized, the positioning coils 18-22 generate a magnetic field. The magnetic field acts upon the magnetic elements 50 secured to the shaft 46 and the actuator 14 moves within the bore 26. The direction of movement and the strength of movement are determined by the number of positioning coils 18-22 that are energized or "turned on."

Figure 2:
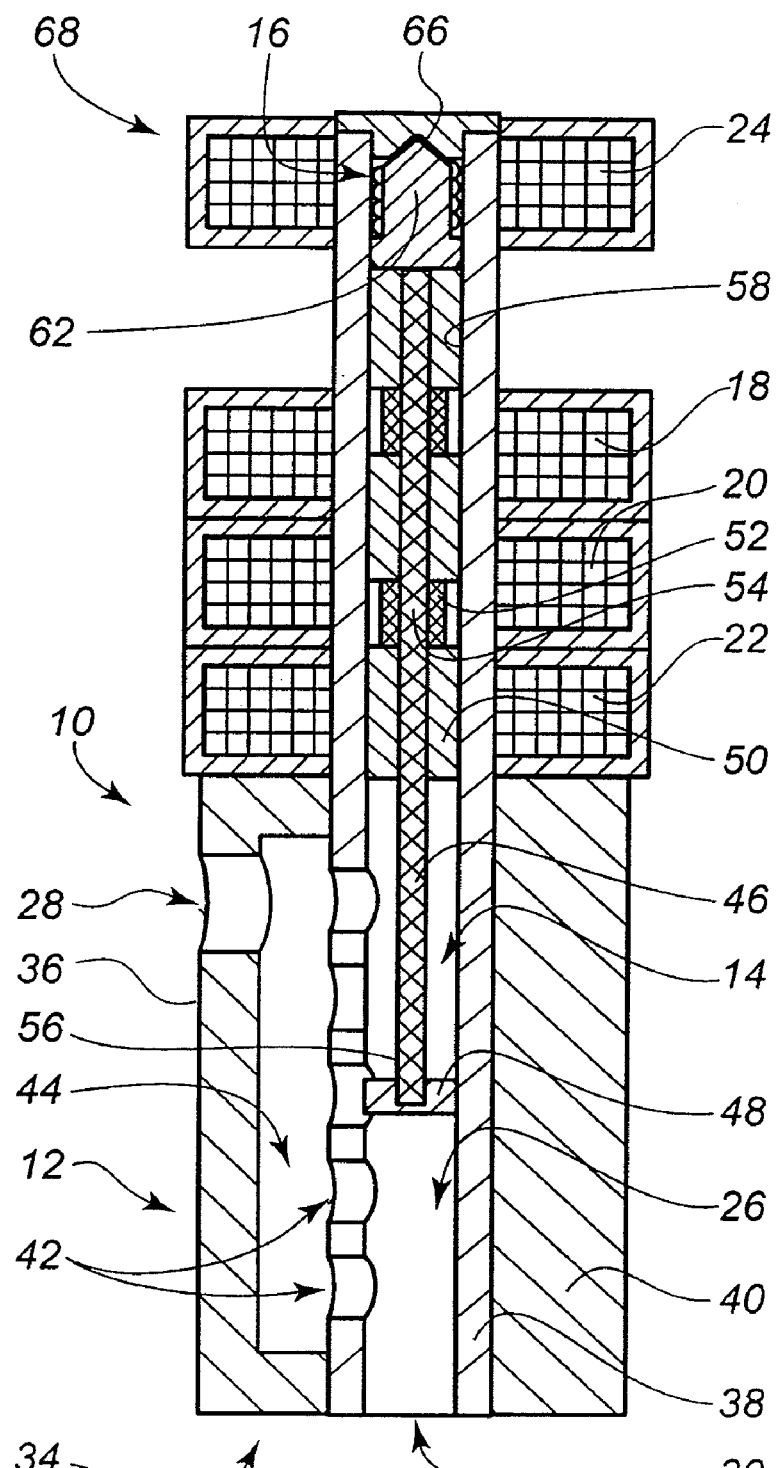
FIG. 2 is a cross sectional view of the variable flow valve of FIG. 1 in a full on position.

When a sufficient number of the positioning coils 18-22 are activated, the biasing agent 16 is driven by the actuator 14 to a retracted position 68 as shown in FIG. 2. In the retracted position 68, the biasing agent 16 is thrust toward the top 32 of the housing 12. In the illustrated embodiment, the spring 60 of the biasing agent 16 is compressed between the top 32 of the housing 12 and the spring lock plunger 62. Each of the spring 60 and the spring lock plunger 62 is disposed proximate the locking coil 24 at the top 32 of the housing 12.

Figure 3:
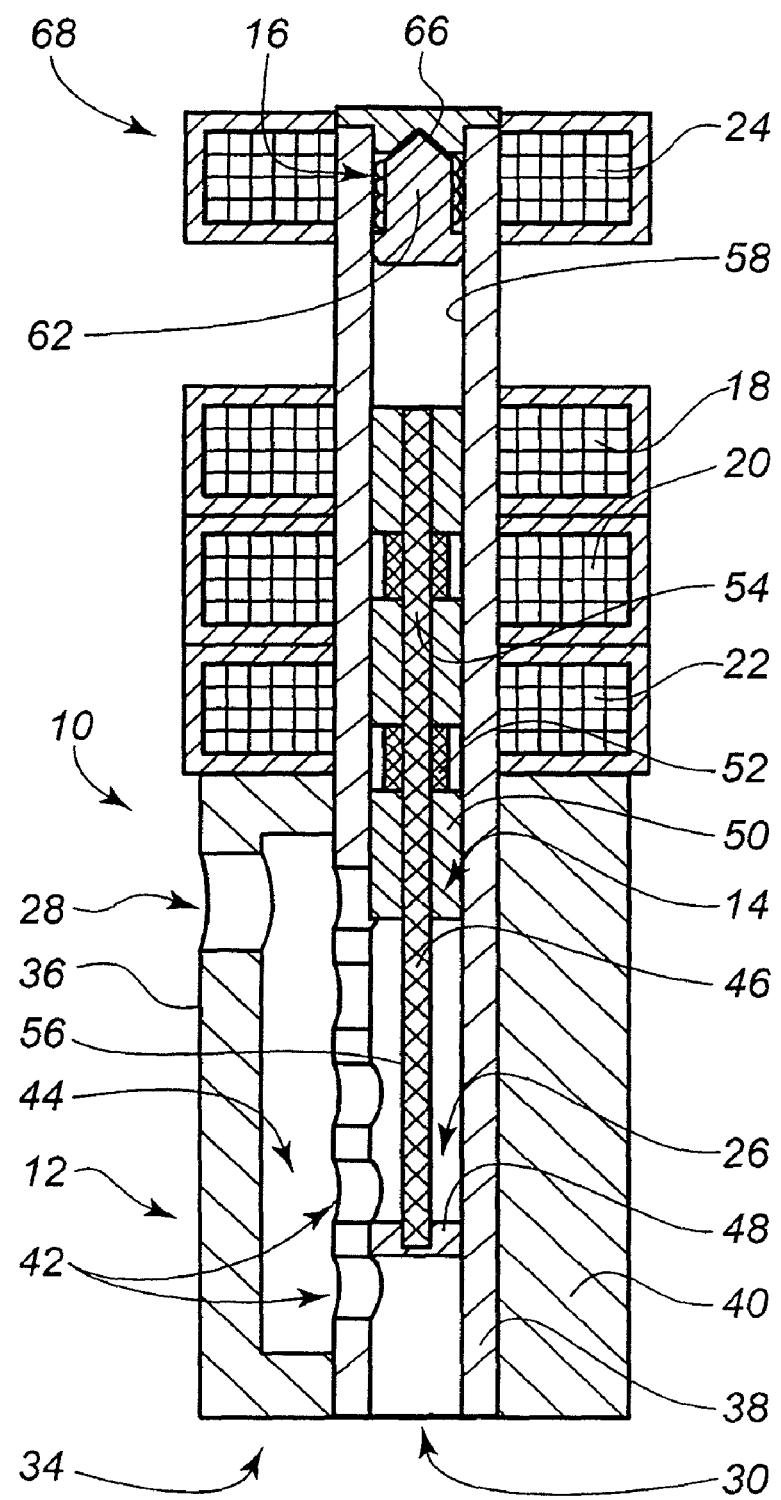
FIG. 3 is a cross sectional view of the variable flow valve of FIG. 1 during operation where fluid is being metering out and a biasing agent captured in a retracted position.

As shown in FIGS. 1-3, the locking coil 24 is disposed about the housing 12 proximate the top 32. In the illustrated embodiment, a single locking coil 24 is illustrated. Even so, more of the locking coils 24 may be suitably employed. Although not shown, the locking coil 24 is electrically connected to a power source. When energized, the locking coil 24 generates a magnetic field. The magnetic field captures the biasing agent 16 in the retracted position 68 as shown in FIG. 3.

When the locking coil 24 has captured or is holding the biasing agent 16 in the retracted position of FIG. 3, the positioning coils 18-22 are thereafter able to move the actuator 14 back and forth in the bore 26 of the housing 12 free of the bias from the biasing agent 16. As a result, the actuator 14 need not continually and repeatedly overcome or over power the biasing force of the biasing agent 16 to transition the actuator between metering positions. Therefore, the net power consumed by the variable flow valve 10 is reduced and the variable flow valve 10 is able to more cost efficiently meter fluid.

In operation, the positioning coils 18-22 are energized to create a magnetic field around the housing 12 proximate the magnetic elements 50. The magnetic field acts upon the magnetic elements 50 such that the magnetic elements 50 drive the actuator 14 toward the top 32 of the housing 12. When the actuator 14 is driven upwardly, the spring lock plunger 62 and the coil spring 60 of the biasing agent 16 are forcibly pushed toward the top 32 of the housing 12 until the retracted position 68 is achieved.

Once the biasing agent 16 is in the retracted position, the locking coil 24 is energized to generate a magnetic field proximate the top 32 of the housing 12. The magnetic field captures and hold the biasing agent 16 in the retracted position 68. As such, the biasing agent 16 is prevented from biasing the actuator 14. Therefore, the actuator 14 may be more easily driven by the positioning coils 18-22 to variously meter fluid from the outlet 30. The locking coil 24 generally holds the biasing agent 16 in the retracted position through the duration of the time the valve 10 is metering out fluid.

To stop the flow of fluid from the outlet 30, the locking coil 24 and the positioning coils are de-energized. When this occurs, the magnetic field generated by the locking coil 24 rapidly dissipates and the biasing agent 16 is released. The freed biasing agent 16 drives the actuator 14 toward the bottom 34 of the housing 12 until the plunger 48 is seated in the outlet 30. Thus, the flow of fluid through the outlet 30 restricted or halted. To begin once again metering fluid, the process is simply repeated.

Figure 4:
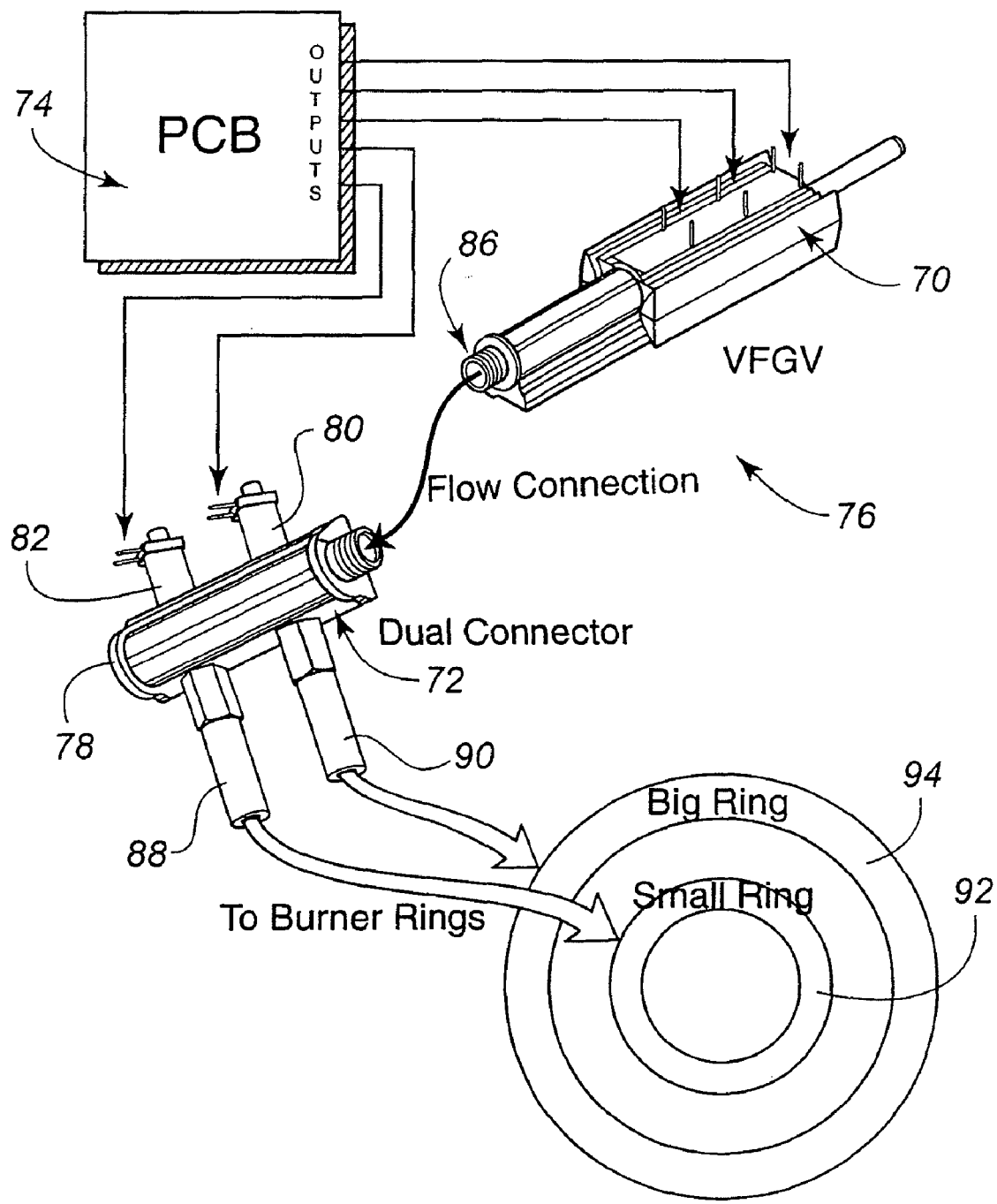
FIG. 4 is a perspective view of a multiple burner gas cooking burner control system into which an embodiment of the variable flow valve and an embodiment of a flow directing mechanism are particularly well suited.

Referring now to FIG. 4, in one embodiment a variable flow valve 70, which may or may not include a locking coil similar to the one in the valve 10 of FIG. 1, is operably coupled to a flow directing mechanism 72 and a controller 74 in a flow control system 76. As will be more fully explained below, using a variable flow valve 70 and a flow directing mechanism 72 each controlled by the controller 74, the flow control system 76 is able to redirect, or simultaneously feed, fluid from a single source to several different outlets.

In the illustrated embodiment of FIG. 4, the flow directing mechanism 72 is a multi-outlet flow control valve 78 having a set of solenoids 80, 82. An inlet 84 of the multi-outlet flow control valve 78 is operably coupled to an outlet 86 of the variable flow control valve 70. Therefore, the valve multi-outlet flow control valve 78 and the variable flow valve 70 are connected in series. In this configuration, the controller 74 is able to electronically control combinations of fluid flow outputs 88, 90 for multiple outlets such as, for example, burners 92, 94 (a.k.a., surface hob burner-rings, burner elements, etc.). For easy of understanding from this point onward the description will refer to the fluid as being gas.

By using one variable flow control valve 70 to feed the multi-outlet fluid flow control valve 72 having the system of solenoids 80, 82, which in turn feeds a system of burners 92, 94, it is now possible to turn off and on combinations of any particular Jet and Burner Configuration (J&BC) with an electronic controller 74. In one embodiment, this is dependant on the J&BC being equal to or more than the metering/flow rating of the variable flow valve 70.

Figure 5:
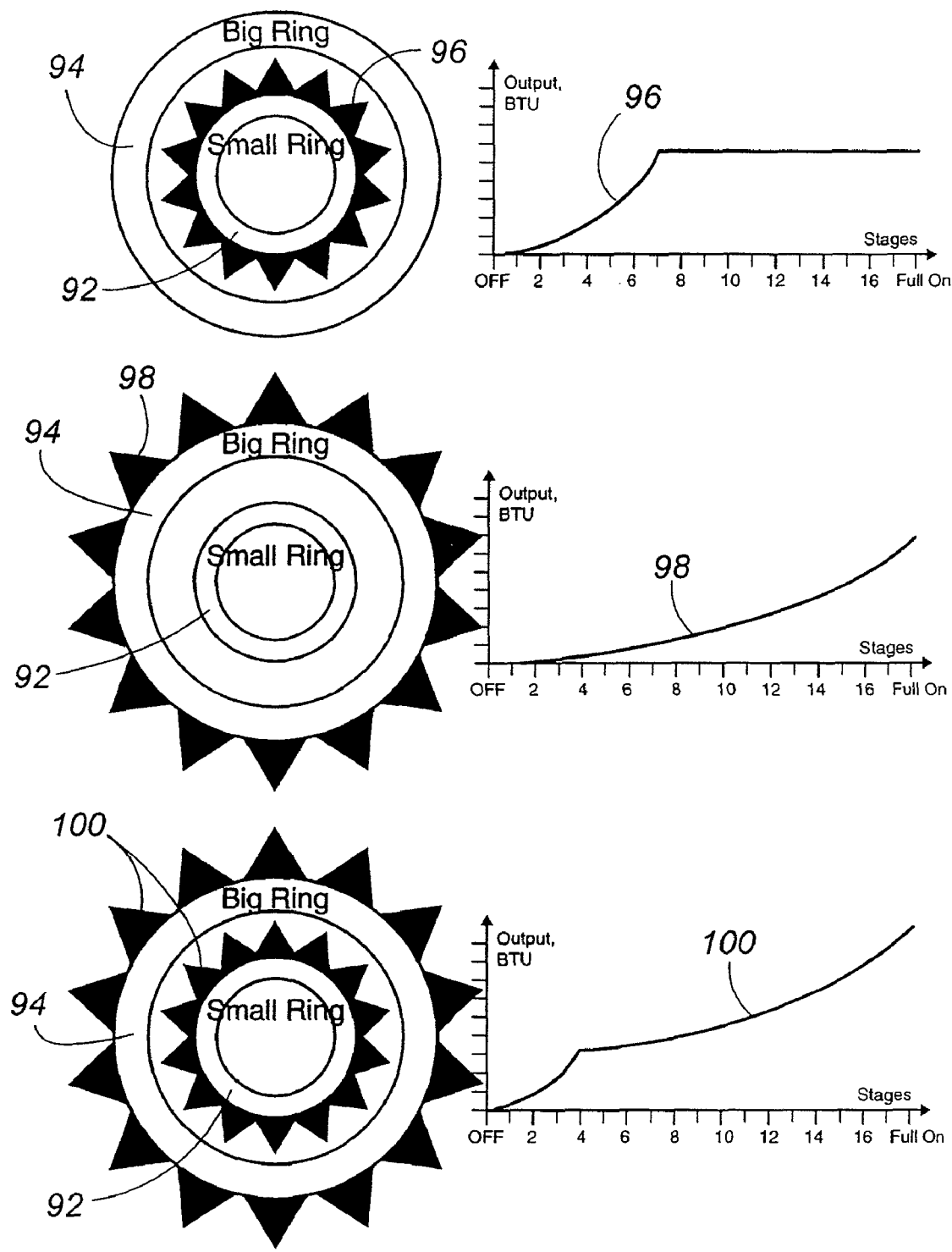
FIG. 5 is a graphical illustration of burner control strategies employable for the multiple burner gas cooking control system enabled by an embodiment of the flow directing mechanism.

In FIG. 5, the concept detailed in the previous paragraphs is illustrated. Specifically, the controller 74 energizes the solenoid 86 of the multi-outlet fluid flow control valve 78 that controls the gas flow to burner 92. The controller 74 then controls the variable flow valve 70 to control the British thermal unit (BTU) output of the burner 92 as illustrated by flame and trace 96. As may be seen in FIG. 5, when the smaller, inner burner 92 volume J&BC reaches its capacity, its BTU curve flattens because no more volume of gas would be released through this J&BC due to the limiting factor being the Jet, or orifice size. However, at this point the valve 78 can either divert or add in another J&BC (e.g., burner 94) that is the same or larger in capacity than the first J&BC (e.g., 92). The BTU output for the larger burner 94 is illustrated by flame and trace 98. The controller 74, however, in conjunction with the valve 78 and the valve 70, now coordinates operation so that a variable or combined BTU output, as illustrated by flames and trace 100, is achieved by controlling operation of each of the solenoids 80, 82.

Additionally, the controller 74 can customize requirements to anyone by either shutting off the inner burner 92 and diverting gas to the outer burner 94 or adding to the outer burner 94 to the inner burner 92 so that both are running at the same time. This is achieved in one embodiment by using a set or sets of solenoids that are feed by one variable flow valve 70, which is in series and/or using in the system a logic based software program to communicate between each device that can also be customized to suit a particular customer's application.

Figure 6:
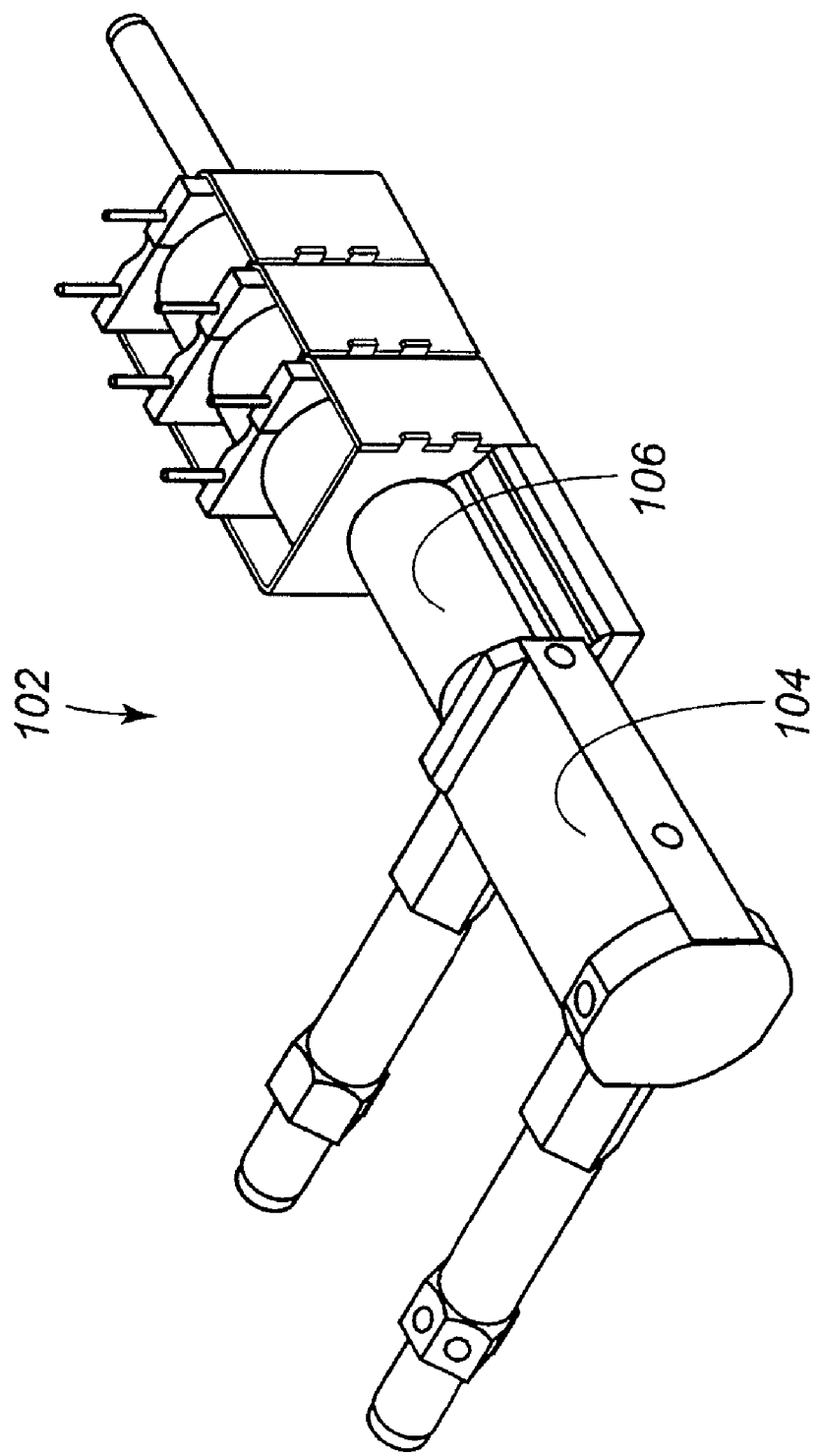
FIG. 6 is a perspective view of an alternative embodiment of the variable flow valve and the flow directing mechanism of FIG. 4.

An alternate embodiment of the multi-outlet fluid flow control valve 102 is illustrated in FIG. 6. As may be apparent from FIG. 6, this embodiment of the control valve 102 integrates the functionality of the variable flow valve 70 and the control valve 78 illustrated in FIG. 4. In this embodiment, the dual connector 104 is mounted to the variable flow valve body 106 instead of the outlet fitting as in FIG. 4, and the dual connector separating flow piston is mechanically connected to the piston of the valve 106.

In a further embodiment, functionality is expanded by allowing the valve to meter fluid flow and redirect it to the different outlets. In the valve embodiments shown in FIGS. 7, 8 and 9, which may or may not include a locking coil as illustrated in the embodiment of FIG. 1, a variable flow valve 210 includes a linear stepper motor. In the preferred embodiment the variable valve includes a housing 212, closed at one end and open at the other, the open end forming an outlet 214. It should be noted that the valve 210 can be used in any orientation. However, for the purposes of this description, the closed end will be described as at the top of the valve, with the open end at the bottom of the valve housing 212.

Outlet 214 is the outlet point for gases or other fluids flowing through the valve, and can be fitted with any suitable attachment means or connector. Towards the closed end, the housing 212 is surrounded by at least two and preferably three magnetic field generators 216, 218, 220 (a.k.a., coils) arranged linearly along part of the length of the housing 212. Preferably the magnetic field generators each comprise a surrounding the housing, with each coil 216-220 equally spaced from its neighbours. Each coil 216-220 is preferably surrounded by a core 222 preferably built from iron laminations, communally referred to as a cage. Each coil 216-220 may have leads (not shown) that are connected to a power supply. Each of coils 216-220 can be individually energized by the power supply under control of a controller according to a switching sequence. Preferred sequences control will be described below.

Towards the other end of the housing 212, metering apertures 224 pass from an outer part of the housing 212 to the inside surface of a bore. The metering apertures 224 are axially spaced along at least part of the length of the housing 212. In the preferred embodiment, there are five metering apertures, each spaced at equal distances from its neighbours. If differing flow profiles are required, the profiles can be generated by having differing cross sectional areas of the metering apertures 224.

The lower part of the housing 212 is surrounded by a sleeve portion. The sleeve fits flush with the outside surface of the housing 212, except where the metering apertures 224 pass into and out of the housing 212. There the sleeve is spaced slightly away from the external surface of the housing 212 to form a chamber 226. The chamber is sealed, apart from the metering apertures 224 and a primary inlet 228. The primary or master inlet 228 serves as the main entry point for gases or other fluid entering the valve. The inlet 228 may be fitted with any suitable attachment or connector, for connecting the inlet 228 to a gas or fluid reservoir.

Within the housing 212 there is a valve member or piston. The valve member includes a plunger 230 attached to the end of a valve stem 232. The plunger 230 lies towards the open end of housing 212. Plunger 230 is made from any suitable material or combination of materials which allow the edge or edge surfaces of plunger 230 to lie flush with or close to the inside surface of housing 212 and form a substantial seal between the periphery of plunger 230 and housing 212. The plunger 230 may also incorporate a sealing means such as rubber o-ring.

At the other end of valve stem 232 are at least two magnetic elements 234. These elements be made from any magnetic material. In this embodiment, the number of magnetic elements corresponds to the number of coils 216-220. Each of the three magnetic elements shown in these embodiments are separated from each other by a non-magnetic insert 236 added to the stem 232 between the magnetic elements 234. These are equally spaced where three or more magnetic elements 234 are used.

The spacing of the magnetic elements corresponds to the spacing of the coils 216-220 along the outside of the housing 212 so that when one of the magnetic element 234 segments is entirely within the coils 216-220, one of the neighbouring segments will be approximately halfway between the coils. When a magnetic element 234 is partially, but not entirely within a coil 216-220, as arranged in this embodiment, the energization of the coil will create a significant attractive force pulling the magnetic element toward its center. This staggered spacing allows the opening and closing drive sequence of the valve motor to be similar to that of a linear stepper motor. The length of the magnetic elements 234 also correspond approximately with the length of the coils 216-220. Therefore, each of the coils 216-220 and segments 234 are approximately the same length.

A spring 238 is located between the closed end of the housing 212 and the end of the valve stem 232 and generally within a piston housing 240. The spring 238, housing 212, and valve stem 232 are all dimensioned relative to one another such that in the neutral position (that is, with power to all of the coils turned off) the plunger 230 will block and seal the outlet 214. Spring 238 is a preferred option for urging the valve member toward the seal, but any suitable biasing agent would be used, including gravity.

Figure 7:
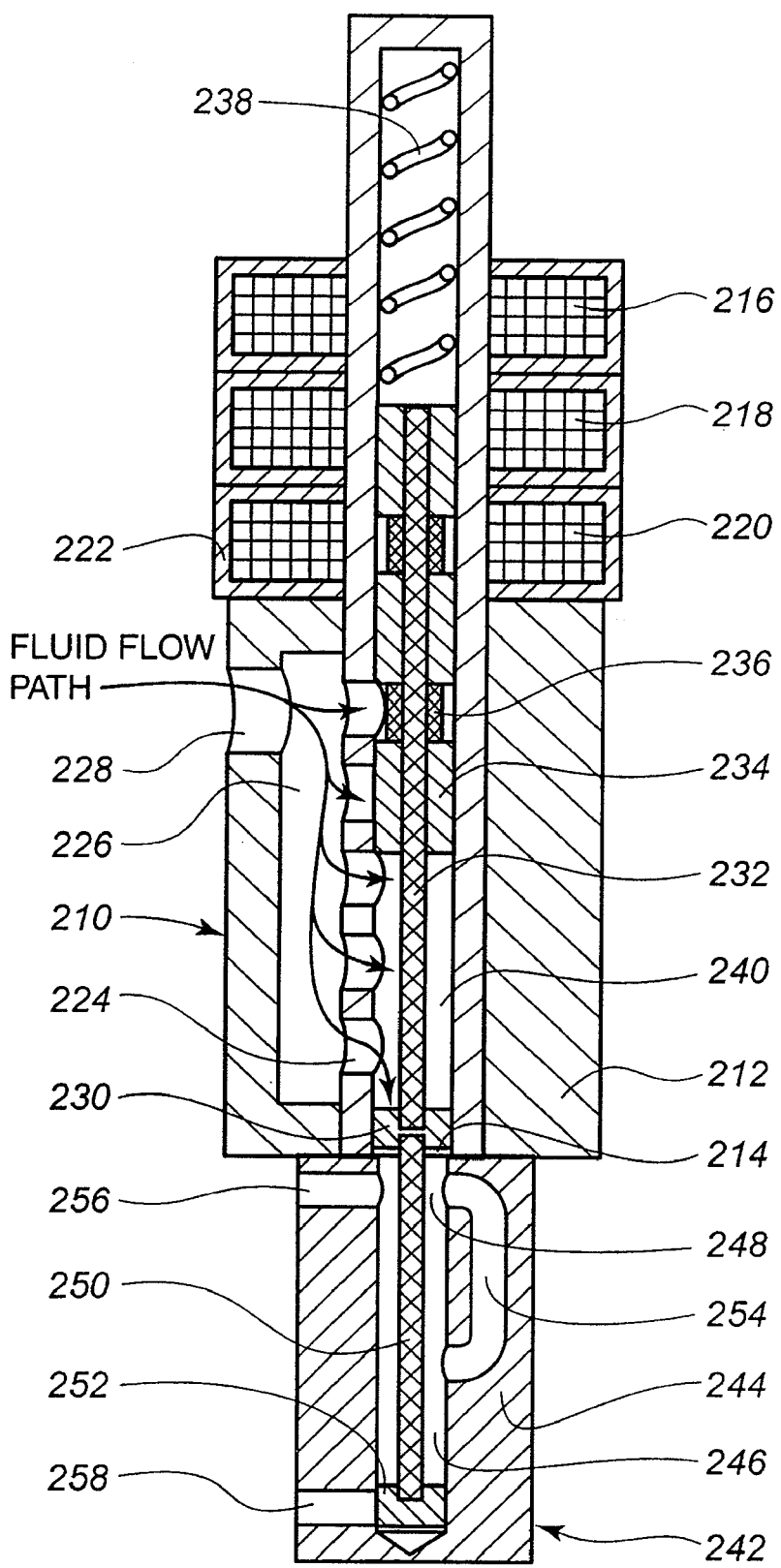
FIGS. 7-9 are cross sectional views of a further alternate embodiment of the variable flow valve outfitted with a flow directing mechanism in various stages of operation and constructed in accordance with the teachings of the present invention.
Figure 8:
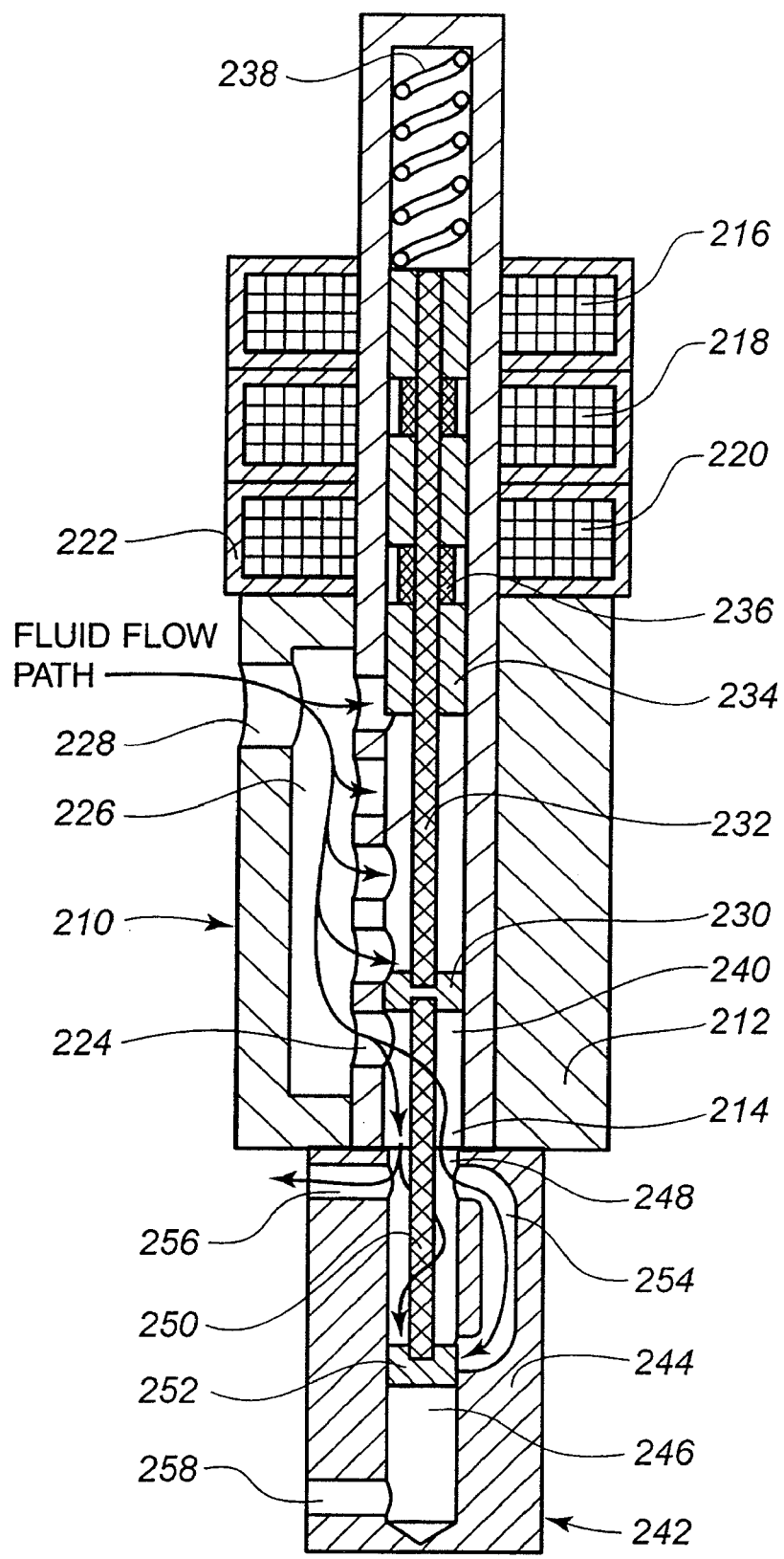
Figure 9:
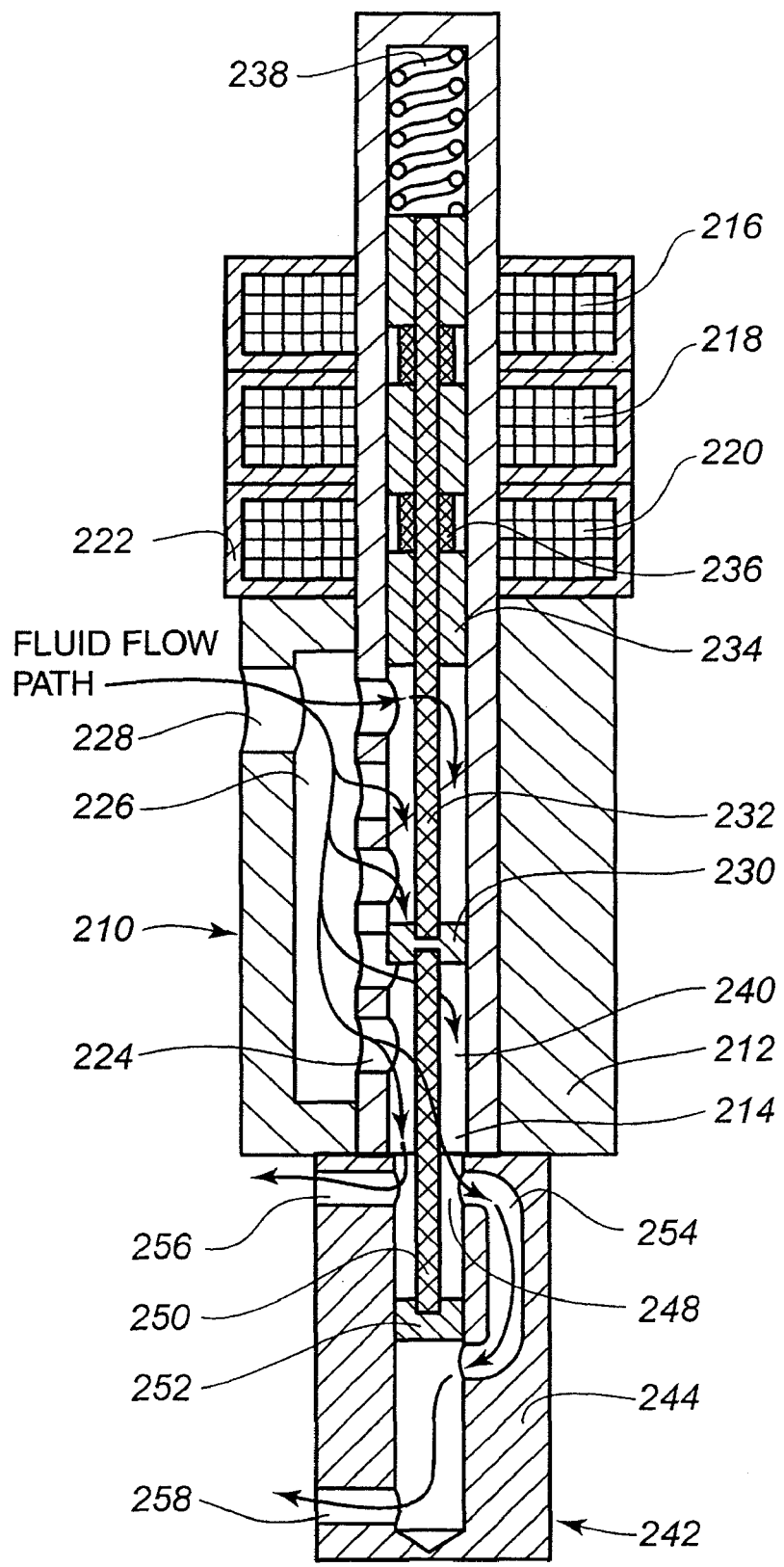

In the embodiment illustrated in FIGS. 7-9, an output flow splitter 242, which includes a housing 244, a passageway 246 closed from one end and opened from the other end forming an inlet 248, a splitter shaft 250, a plunger 252, a bypass chamber 254 and at least two outlets 256 and 258, is included. The housing 244 of the output flow splitter 242 is attached to the housing 212 of the valve 210 with no possibility of a leak to the atmosphere. The inlet 248 of the output flow splitter 242 is connected to the valve outlet 214 and a splitter shaft 250 is mechanically jointed to the plunger 230 of the valve 210 and the plunger 252 of the output flow splitter.

In the fully closed position (FIG. 7), the plunger 230 blocks the fluid flow to outlet 256 via outlet 214 of housing 212 and inlet 248 of the an output flow splitter housing 244. When the plunger 230 is pulled from the fully closed position towards the coils 216220, the plunger opens the inlet 248 of the an output flow splitter and allows fluid flow to the outlet 256. The outlet 258 is still separated from fluid flow by chamber 254 and the plunger 252 (see FIG. 8) not allowing flow to enter the passageway 246 in front of plunger 252.

When the valve member continues moving towards coils 216-220 thereby increasing flow to the outlet 214 of housing 212 (shown in FIG. 9), the plunger 252 opens the bypass chamber 254 and allows flow through outlet 258 via bypass chamber 254 and passageway 246 in front of plunger 252.

From the foregoing, those skilled in the art will recognize that the variable flow valve 10, 70, 210 uses less power than conventional flow control valves. Therefore, the variable flow valve 10, 70, 210 provides substantial cost savings during day to day operation and over the life of the system where the valve is used. Because the variable flow valve 10, 70, 210 is also able to operably couple to a flow directing mechanism, the valve is able to meter out a particular amount of fluid and then divide that fluid between multiple outputs.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A variable flow valve, comprising:
   a housing defining a bore, an inlet, and an outlet;
   an actuator moveably disposed within the bore, the actuator configured to selectively obstruct and expose the outlet;
   a biasing agent disposed within the bore, the biasing agent interposed between the housing and the actuator to bias the actuator toward the outlet;
   at least one positioning coil disposed about the housing, the at least one positioning coil operable to drive the biasing agent to a retracted position; and
   a locking coil disposed about the housing, the locking coil operable to capture the biasing agent in the refracted position such that the at least one positioning coil is thereafter able to move the actuator free of the bias from the biasing agent.

2. The variable flow valve of claim 1, wherein the locking coil is axially spaced apart from the at least one positioning coil.

3. The variable flow valve of claim 1, wherein the biasing agent is a coil spring and a metallic spring lock plunger, the coil spring compressed when the biasing agent is driven into the retracted position.

4. The variable flow valve of claim 2, wherein the actuator is a shaft having a plurality of magnetic elements disposed about the shaft, the magnetic elements axially spaced apart by non-magnetic elements.

5. The variable flow valve of claim 1, wherein the at least one positioning coil comprises first, second and third positioning coils and the shaft includes magnetic elements, the magnetic elements spaced apart to correspond to spacing between the first, second and third positioning coils.

6. The variable flow valve of claim 1, wherein variable flow valve further comprises a flow directing mechanism operably coupled to the outlet of the housing, the flow directing mechanism directing fluid to two or more outlets.

7. The variable flow valve of claim 6, wherein the flow directing mechanism is selected from the group consisting of an outlet flow splitter having a bypass chamber and a multi-output fluid control valve having a plurality of solenoids.

8. The variable flow valve of claim 1, wherein the locking coil releases the biasing agent from the retracted position such that the biasing agent is able to bias the variable flow valve into a closed position where the outlet is obstructed.

9. A variable flow valve, comprising:
   a housing defining a bore, an inlet, and an outlet;
   a shaft disposed within the bore, the shaft having first and second ends, the first end including a plunger to restrict a flow of fluid through the outlet;
   a plurality of magnetic and non-magnetic elements alternatingly disposed on the shaft beginning proximate the first end;
   a spring lock plunger disposed within the bore and adjacent the first end of the shaft;
   a coil spring disposed within the bore, the coil spring interposed between the spring lock plunger and the housing;
   a plurality of positioning coils disposed about the housing, the positioning coils selectively operable to drive the actuator back and forth within the bore; and
   a locking coil disposed about the housing, the locking coil operable to hold the spring lock plunger and coil spring away from the shaft such that the coil spring exerts no biasing force upon the shaft.

10. The variable flow valve of claim 9, wherein at least one of the magnetic elements on the shaft prevents fluid from flowing through the bore toward the coil spring and the housing includes a plurality of sub-inlets in fluid communication with the inlet and selectively with the outlet.

11. The variable flow valve of claim 9, wherein the magnetic elements engage an internal wall of the bore while the non-magnetic elements are spaced apart from the internal wall.

12. The variable flow valve of claim 9, wherein a portion of the housing proximate the locking coil includes a spring lock plunger receptacle configured to receive the spring lock plunger.

13. The variable flow valve of claim 9, wherein the plurality of positioning coils are axially spaced apart from the locking coil along the housing.

14. The variable flow valve of claim 9, wherein the variable flow valve is operably coupled to a flow directing mechanism.

15. A flow control system, comprising:
   a variable flow control valve including a plurality of positioning coils and a locking coil, the locking coil retaining a biasing agent in a retracted position when energized;
   a multi-outlet fluid control valve operably coupled to the variable flow control valve, the multi-outlet fluid control valve including a plurality of solenoids; and
   a controller operably coupled to the variable flow control valve and the multi-outlet fluid control valve, the controller able to simultaneously control the positioning coils, the locking coil, and the solenoids to meter a fluid to an appliance.

16. The flow control system of claim 15, wherein the appliance is a range and the fluid is a gas.

17. The flow control system of claim 15, wherein the biasing agent is a coil spring and a metallic spring plunger.

18. The flow control system of claim 15, wherein the variable flow control valve includes an axial shaft moveable within an axial bore, the axial shaft including thereon a plurality of metallic elements, the metallic elements configured to move when a magnetic field is generated by the positioning coils.

* * * * *